(12) United States Patent
Wild et al.

(10) Patent No.: US 9,276,796 B2
(45) Date of Patent: Mar. 1, 2016

(54) METHOD AND PROCESSING ARRANGEMENT FOR JOINT PROCESSING OF UPLINK DATA

(71) Applicant: ALCATEL LUCENT, Boulogne Billancourt (FR)

(72) Inventors: Thorsten Wild, Stuttgart (DE); Uwe Doetsch, Freudental (DE); Osman Aydin, Stuttgart (DE); Stephen Kaminski, Eislingen (DE); Christian Gerlach, Ditzingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/737,838

(22) Filed: Jun. 12, 2015

(65) Prior Publication Data

US 2015/0280955 A1  Oct. 1, 2015

Related U.S. Application Data

(63) Continuation of application No. 13/379,179, filed as application No. PCT/EP2010/055540 on Apr. 26, 2010, now abandoned.

(30) Foreign Application Priority Data

Jun. 19, 2009 (EP) .................................... 09290467

(51) Int. Cl.
*H04L 27/26* (2006.01)
*H04L 5/00* (2006.01)
(Continued)

(52) U.S. Cl.
CPC .......... *H04L 27/2655* (2013.01); *H04B 17/364* (2015.01); *H04L 5/0001* (2013.01);
(Continued)

(58) Field of Classification Search
CPC .. H04B 17/364; H04L 5/0001; H04L 5/0023; H04L 25/0202; H04L 25/0204; H04L 25/0212; H04L 25/024; H04L 25/0242; H04L 27/265; H04L 27/2655; H04L 27/2662; H04L 27/2666; H04L 27/2671; H04W 88/00; H04W 88/08

USPC .......... 375/259–262, 265, 267; 370/208, 210, 370/335–337, 342, 347; 455/463, 500, 507, 455/517, 524, 84, 88

See application file for complete search history.

(56) References Cited

U.S. PATENT DOCUMENTS

| 5,663,958 A | 9/1997 | Ward |
| 6,011,787 A | 1/2000 | Nakano et al. |

(Continued)

FOREIGN PATENT DOCUMENTS

| CN | 1498454 | 5/2004 |
| CN | 101170354 | 4/2008 |

(Continued)

OTHER PUBLICATIONS

Huawei, "System Performance Evaluation for Uplink CoMP," 3$^{rd}$ Generation Partnership Project (3GPP), 3GPP TSG RAN WG1 Meeting #56bis, R1-091618, 9 pages, XP050339161, Seoul, Korea, Mar. 13-27, 2009.

(Continued)

*Primary Examiner* — Young T Tse
(74) *Attorney, Agent, or Firm* — Fay Sharpe LLP

(57) ABSTRACT

The invention relates to a method for joint processing of uplink data (g(n), s(n)) transmitted from at least one user equipment (UE1, UE2) to a plurality of coordinated reception points ($BS_A$, $BS_B$) of a wireless communication system (1), the method comprising: estimating and preferably compensating for individual propagation delays of the uplink data (g(n), s(n)) transmitted from one of the user equipments (UE1, UE2) to the coordinated reception points ($BS_A$, $BS_B$), and compensating a timing difference between a propagation delay of a coordinated reception point ($BS_A$, $BS_B$) which serves the user equipment (UE1, UE2) and at least one propagation delay of at least one coordinated reception point ($BS_B$, $BS_A$) which does not serve the user equipment (UE1, UE2) for performing the joint processing of the uplink data (g(n), s(n)), wherein the step of compensating the timing difference comprises modifying a channel matrix (H) associated with uplink channels from the at least one user equipment (UE1, UE2) to the coordinated reception points ($BS_A$, $BS_B$). The invention also relates to a processing arrangement ($BS_A$, $BS_B$, 2) adapted for performing the method.

15 Claims, 1 Drawing Sheet

(51) Int. Cl.
H04L 25/02 (2006.01)
H04B 17/364 (2015.01)

(52) U.S. Cl.
CPC ............ *H04L5/0023* (2013.01); *H04L 25/024* (2013.01); *H04L 25/0204* (2013.01); *H04L 25/0242* (2013.01); *H04L 27/2662* (2013.01)

(56) References Cited

U.S. PATENT DOCUMENTS

| | | | |
|---|---|---|---|
| 2002/0037737 A1* | 3/2002 | Learned et al. | 455/526 |
| 2004/0057530 A1 | 3/2004 | Tarokh et al. | |
| 2008/0125045 A1 | 5/2008 | Nakao | |
| 2008/0239938 A1 | 10/2008 | Jalloul et al. | |
| 2011/0183669 A1 | 7/2011 | Kazmi | |

FOREIGN PATENT DOCUMENTS

| | | |
|---|---|---|
| WO | WO 02078171 | 10/2002 |
| WO | WO 2005/024995 | 3/2005 |

OTHER PUBLICATIONS

Fujitsu, "Pseudo Transmission Timing Control using Cyclic Shift for Downlink CoMP Joint Transmission," 3$^{rd}$ Generation Partnership Project (3GPP), 3GPP TSG-RAN1 #57, R1-091956, 8 pages, XP050339429, San Francisco, CA, USA, May 4-8, 2009.

Nortel, "Discussion on the Support of DL CoMP Transmission," 3$^{rd}$ Generation Partnership Project (3GPP), 3GPP TSG-RAN Working Group 1 Meeting #57, R1-091915, 3 pages, XP050339403, San Francisco, US, May 4-8, 2009.

Nortel, "LTE-A Downlink Multi-site MIMO Cooperation," 3$^{rd}$ Generation Partnership Project (3GPP), 3GPP TSG-RAN working Group 1 Meeting #54b, R1-083870, 7 pages, XP050317184, Prague, Czech Republic, Sep. 29-Oct. 3, 2009.

Osseiran et al., "The Road to IMT-Advanced Communication Systems: State-of-the-Art and Innovation Areas Addressed by the WINNER+ Project," IEEE Communications Magazine, vol. 47, No. 6, pp. 38-47, XP011263344, Jun. 1, 2009.

Parkvall et al., "The Evolution of LTE towards IMT-Advanced," Journal of Communications, Academy Publishers, vol. 4, No. 3, pp. 146-154, XP008113534, Apr. 1, 2009.

Wang et al., "Application of BBU+RRU Based Comp System to LTE-Advanced," Communications Workshop, 5 pages, XP031515467, Jun. 14, 2009.

Irmer et al, "Multisite Field Trial for LTE and Advanced Concepts," IEEE Communications Magazine, IEEE Service Center, vol. 44, No. 2, pp. 92-98, XP011251781, Feb. 1, 2009.

International Search Report for PCT/EP2010/055540 dated Aug. 23, 2010.

* cited by examiner

METHOD AND PROCESSING ARRANGEMENT FOR JOINT PROCESSING OF UPLINK DATA

This application is a continuation of U.S. patent application Ser. No. 13/379,179, filed on Mar. 13, 2012, which is a 371 of PCT/EP2010/055540, filed Apr. 26, 2010, which claims priority from EP 09 290 467.1, filed Jun. 19, 2009, the disclosures of which are hereby incorporated by reference.

FIELD OF THE INVENTION

The invention relates to the field of signal processing in wireless communication systems, and, in particular, to joint processing of uplink data transmitted from user equipments to coordinated reception points in wireless communication systems.

BACKGROUND

This section introduces aspects that may be helpful in facilitating a better understanding of the invention. Accordingly, the statements of this section are to be read in this light and are not to be understood as admissions about what is in the prior art or what is not in the prior art.

When performing joint processing (JP) of uplink coordinated multi-point transmissions (so-called COMP), one has to deal with multi-path propagations leading to different timing/propagation delays to the different reception points (e.g. base stations) of a COMP coordination cluster. If the difference of the timing offsets due to the different propagation delays exceeds the length reserved for the cyclic prefix in an Orthogonal Frequency Division Multiplex, OFDM, transmission scheme, the joint processing of the uplink signals of different COMP reception points (for example located in different base stations (BS), such as enhanced NodeBs "eNBs") in a single receiver is no longer possible.

For this reason 3GPP has defined two different cyclic prefixes (CP), a normal and an extended one. To allow for joint processing, the length of the extended cyclic prefix can be configured to allow for a corresponding maximum difference of the timing offsets (delay spread) of the uplink radio signals received in the different reception points. However, using such an extended cyclic prefix has the disadvantage of generating an additional overhead, which reduces the achievable overall uplink throughput. With the normal cyclic prefix, 14 OFDM symbols can be used for the transmission within one sub-frame of the duration of 1 ms. Using the extended cyclic prefix allows for only 12 OFDM symbols per sub-frame. Using the extended cyclic prefix instead of the conventional cyclic prefix thus results in a throughput reduction that amounts to about 20 percent.

SUMMARY OF THE INVENTION

One aspect of the invention relates to a method for joint processing of uplink data transmitted from at least one user equipment to a plurality of coordinated reception points of a wireless communication system, the method comprising: estimating and preferably compensating for individual propagation delays of the uplink data transmitted from one of the user equipments to the coordinated reception points, and compensating for a timing difference between a propagation delay of a coordinated reception point which serves the user equipment and at least one propagation delay of at least one coordinated reception point which does not serve the user equipment for performing the joint processing of the uplink data, wherein the step of compensating the timing difference comprises modifying a channel matrix associated with uplink channels from the at least one user equipment to the coordinated reception points.

Typically, each user equipment is served with downlink data from only one so-called "serving" reception point, a timing advance being provided for aligning the timing of the user equipment to its serving reception point (in the following also referred to as a cell). Thus, the propagation delay from a user equipment to its serving coordinated reception point may be compensated by adjusting, in the time domain, the position of a processing window for performing a time-to-frequency-domain transformation, in particular a Fast-Fourier-Transformation, FFT, on symbols of the uplink data. A dedicated timing delay/offset estimation within the layer1 processing of the serving cell may be used for this purpose. However, when multiple user equipments have to be detected on the same multiple access (time/frequency/code) resource over several cells by multiple-input-multiple-output (MIMO) receiver strategies/multi-user detection, the problem occurs that the timing of the cells may be different.

For overcoming this problem, the inventors propose to perform a timing offset estimation also in the non-serving cells of the coordination cluster in order to detect the correct timing of the sub-frames and OFDM symbols per user equipment. Thus, the difference in the timing offsets/propagation delays between different cells can be taken into account and can be used to modify the channel matrix (per sub-carrier, see below) associated with the uplink transmissions for taking the timing difference into account. In such a way, joint processing may be performed even if the difference in the propagation delays from one user equipment to different reception points exceeds the length of the cyclic prefix being used in classical OFDMA-based systems. As this solution compensates the propagation delay differences of COMP cells, a type of cyclic prefix can be used that is appropriate for the multi-path propagation conditions, disregarding the timing offset to the non-serving COMP reception points. Hence, there is no need to increase the overhead when applying the COMP reception scheme.

In one variant, the step of modifying the channel matrix comprises performing a phase-shift on channel coefficients of the channel matrix associated with non-serving coordinated reception points. By multiplying the phase into the MIMO channel matrix of the composite COMP MIMO channel, a modified MIMO channel matrix may be generated which compensates for the difference of the timing delays, thus allowing joint processing of the uplink data.

In an improvement of this variant, the step of modifying the channel matrix further comprises modifying an amplitude of the channel coefficients of the channel matrix associated with the non-serving coordinated reception points, preferably by multiplying the channel coefficients with a real number smaller than one. In particular when the difference between the propagation delays of different reception points is large, the size of the processing window for performing a time-to-frequency domain transformation (FFT) on the user data from the non-serving reception points may be considerably reduced. The influence of the reduced size of the processing window may be taken into account by multiplying the corresponding channel coefficients of the channel matrix with a factor smaller than one, the factor depending on the size reduction of the FFT window.

In a further variant, the uplink transmissions from the at least one user equipment to the coordinated reception points are performed in an orthogonal frequency division multiplex, OFDM, transmission scheme, an individual channel matrix being preferably defined for each sub-carrier of the OFDM transmission scheme. When using such a transmission scheme, typically, an individual MIMO channel matrix is defined for each of the sub-carriers or for a group of sub-carriers used for the uplink transmission of the same user equipment.

In one improvement the method further comprises: performing a joint calculation of receiver antenna weights for the plurality of user equipments, the calculation being based on the modified cannel matrix. The modified MIMO channel matrix allows using a single receive combining set of antenna weights for all the antennas of the reception points, i.e. for the whole COMP cluster. It will be understood that several different receiver types may be used for performing the joint processing, for example receivers of the minimum mean-square error, MMSE, and/or successive interference cancellation, SIC, type.

In a further variant, the uplink data is transferred from the coordinated reception points to a centralized unit for performing the joint processing, the uplink data being preferably transferred in the form of time domain or of frequency domain in-phase and quadrature-phase (IQ)-samples, in particular together with information about the propagation delay from each user equipment. In case of frequency domain IQ-samples, also the channel coefficients have to be exchanged between the base stations. When each user on its individual time-base (creating one FFT per user equipment and performing COMP in a non-serving cell with individually matched timing) is detected, the frequency domain IQ samples or soft bits can be transported over the backhaul to a central point (usually the base station of the serving cell) for performing the joint processing of the coordinated multipoint reception. It will be understood that when transferring the uplink data as time domain IQ samples, the information about the timing offset is not required but may nevertheless be present, whereas when transferring frequency domain IQ samples, typically additional information about the propagation delay has to be transferred to the centralized unit. Of course, the uplink data may also be transferred to the centralized unit in another format, e.g. as soft bits or as decoded data.

In a further variant, the joint processing comprises: performing a joint time-to-frequency domain transformation, in particular a Fast-Fourier-Transformation, FFT, on time domain samples of the uplink data of a plurality of user equipments having similar propagation delays to a common non-serving reception point. When two or more user equipments are present which have a similar distance from the same reception point, a joint FFT may be performed for transforming time domain samples of the uplink data to frequency domain samples, thus reducing the overall number of FFTs being required for this purpose, and consequently also the complexity of the calculations. It will be understood that for this purpose, typically the user equipments will be grouped into different sets, each having a similar propagation delay.

A further variant comprises choosing the repetition rate for estimating the propagation delay in dependence of the speed of movement of the user equipment. In particular, the rate for updating of the timing offset estimation (and optionally the grouping as described above) may decrease with decreasing mobility of the (mobile) user equipment, i.e. updates have to be performed less often for slowly moving mobile stations than for rapidly moving mobile users. One skilled in the art will appreciate that different types of user equipment with different mobility characteristics may be used in the wireless network, such as mobile phones, PDAs, Laptops, or also stationary equipment.

In one improvement, the joint processing comprises: performing a Fast-Fourier-Transformation, FFT, on a number of time domain samples of the uplink data in a processing window, the method preferably further comprising: shifting the processing window by subtracting a discrete Fourier transform, DFT, contribution for each sub-carrier of one or more time domain samples at one end of the processing window and adding a discrete Fourier transform, DFT, contribution for each sub-carrier of a corresponding number of time domain samples at the other end of the processing window. One skilled in the art will readily recognize that in the present case, the "processing window" is defined in the frequency domain for a parallel processing of a number of samples corresponding to adjacent sub-carriers of the OFDMA signal.

In the way described above, a further reduction of the number of necessary FFTs for an OFDMA transmission scheme can be performed, as follows: For processing a new set of samples having a FFT window which is just shifted (in the frequency domain) by one or by several samples with respect to a previously processed set of samples, instead of processing a new FFT for the new set of samples, it is proposed to add the DFT contribution per sub-carrier of the one or more new sample values at one end of the FFT window and to subtract the first sample value(s) of the previous FFT window. This concept can also be combined with the concepts described above, e.g. first grouping the user equipments according to their propagation delays, doing a FFT for each of the groups and shifting the FFT window in the above-described manner until all the user equipments of a particular group are covered, thus possibly requiring to perform only one FFT for each group of user equipments.

One skilled in the art will appreciate that the method as described above may also be realized in the form of a computer program product which may be implemented in a suitable software or hardware, in particular a field programmable gate array (FPGA), an application-specific integrated circuit (ASIC), or a digital signal processor (DSP). Of course, the computer program product may also comprise a plurality of separate parts which may be arranged at different locations. It will be understood that the method may in particular be implemented in a suitable software or hardware of a receiver for performing the joint processing, the latter possibly not performing the first step of estimating the propagation delays, as it may receive the information about the estimation from another physical entity together with samples of downlink data.

A further aspect of the invention is implemented in a processing arrangement for joint processing of uplink data transmitted from at least one user equipment to a plurality of coordinated reception points of a wireless communication system, the processing arrangement being adapted to estimate and preferably to compensate for individual propagation delays of the uplink data transmitted from one of the user equipments to the coordinated reception points, the processing arrangement being further adapted to compensate for a timing difference between a propagation delay of a coordinated reception point which serves the user equipment and a propagation delay of at least one coordinated reception point which does not serve the user equipment for performing the joint processing of the uplink data, the processing arrangement being adapted to compensate for the timing difference by modifying a channel matrix associated with uplink channels from the at least one user equipment to the coordinated reception points.

The processing arrangement as described above allows for performing COMP using joint detection without having to increase the length of the cyclic prefix, thus increasing the throughput. It will be understood that in the most simple case, the processing arrangement may be implemented as a receiver for performing the joint processing. However, it may also be possible that the estimation and compensation of the propagation delay to the serving reception point may be performed at a different location as the compensation of the timing difference to the non-serving cells.

In one embodiment, the processing arrangement is adapted for compensating the timing difference adapted for performing a phase-shift on channel coefficients of the channel matrix associated with non-serving coordinated reception points. The channel coefficients which are related to the non-serving reception points typically correspond to the non-diagonal elements of the MIMO channel matrix, whereas the diagonal elements of the MIMO channel matrix represent channels between the user equipment and a respective serving reception point.

In one improvement, the processing arrangement is further adapted for modifying an amplitude of the channel coefficients of the channel matrix associated with the non-serving coordinated reception points, preferably by multiplying the channel coefficients by a real number smaller than one. As described above, in this way, the influence of a size reduction of a processing window for performing a FFT on the non-serving reception points may be taken into account.

In one improvement, the processing arrangement is adapted to perform a joint calculation of receiver weights for the plurality of user equipments, the calculation being based on the modified channel matrix. The receiver weight matrix may be derived from the modified channel matrix by performing matrix calculations, as detailed further below.

In a further embodiment, the uplink data is transmitted from the at least one user equipment to the coordinated reception points in an orthogonal frequency division multiplex, OFDM, transmission scheme, and the processing arrangement is preferably adapted to generate an individual channel matrix for each sub-carrier of the OFDM transmission scheme. In this way, the transmission properties for each sub-carrier of the frequency band of the ODFMA transmission scheme may be optimized individually.

A further aspect is implemented in a base station comprising a processing arrangement as described above. The base station may comprise a central unit comprising a receiving device which is adapted for performing the joint processing of the uplink data. In this case, the reception points may be e.g. be implemented as remote radio heads (RRHs) being arranged remotely from the central unit and serving different sectors of the base station, or the base station may be the serving reception point, the uplink data of further base stations, forming the non-serving coordinated reception points, being transferred to the serving base station e.g. via a backhaul network, the estimation of the propagation delays of the non-serving reception points being performed in the serving base station.

Yet another aspect is implemented in a wireless communication network comprising at least one processing arrangement as described above. In this case, the processing arrangement may comprise several physical entities which may be located at different positions within the network. For example, the reception points may correspond to base stations which are connected via a common backhaul, e.g. packet-based (IP) network, the central unit being located in the backhaul network. It may also be possible to transfer uplink data from the non-serving reception points being located e.g. at different base stations, to the serving reception point (serving base station), the serving base station then performing the joint processing for the user equipment. It will be understood that typically, the serving base station compensates for the propagation delay e.g. in the way described above, and that the propagation delay of the other base stations may be taken into account by an appropriate modification of the channel matrix.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
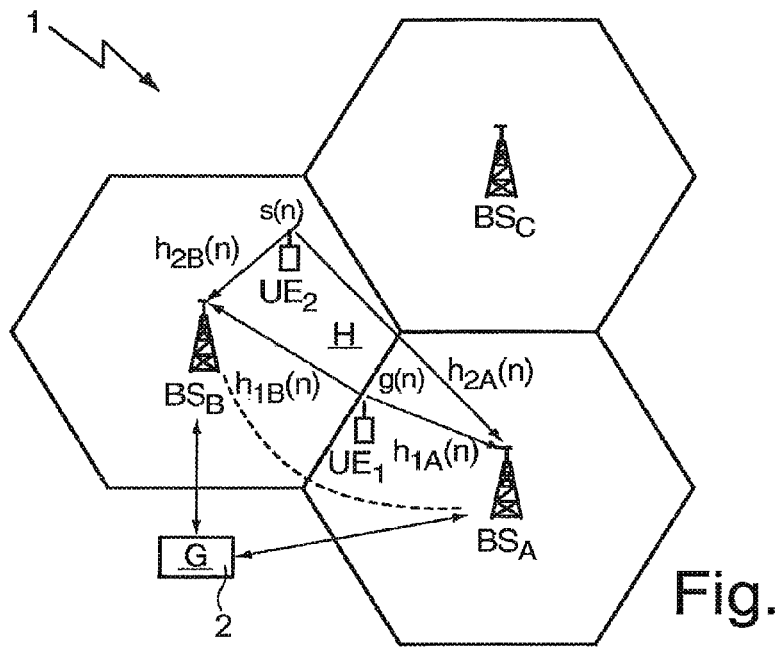
FIG. 1 shows a schematic diagram of an embodiment of a wireless communication network.

FIG. 1 shows a wireless communication network 1 which may be in compliance with e.g. the Long-Term Evolution, LTE, standard, the WiMax standard, or another wireless communication standard. The wireless communication network 1 has a plurality of user equipments; however, for the sake of simplicity, only a first and second user equipment UE1, UE2 are shown. The first user equipment UE1 is served by a first base station $BS_A$, and the second user equipment UE2 is served by a second base station $BS_B$ of the network 1, respectively. The term "serving" base station refers to the provisioning of downlink data from the respective base station $BS_A$, $BS_B$ to the user equipment UE1, UE2, typically the serving base station being the one which is closest to the served user equipment. Each base station $BS_A$, $BS_B$ defines a cell, being represented by a hexagon in FIG. 1.

The first and second user equipment UE1, UE2 transmit their respective uplink data g(n), s(n) to both the first and to the second base station $BS_A$, $BS_B$, respectively. The base stations $BS_A$, $BS_B$ thus form coordinated reception points for performing uplink coordinated multi-point transmission (COMP) and are operatively connected to a centralized unit 2 for performing joint processing (JP) of the uplink data, the centralized unit 2 being arranged at a remote location, e.g. in a (high-speed) data network. Thus, the first and second base stations $BS_A$, $BS_B$ are coordinated, whereas a third base station $BS_C$ of the network 1 does not form part of the COMP coordination cluster as defined by the first and second base stations $BS_A$, $BS_B$.

One skilled in the art will appreciate that alternatively, the coordinated reception points may be implemented as different sectors (corresponding e.g. to remote radio heads, RRHs) of the same base station, a backhaul processing unit of the base station serving as a centralized unit in this case (the propagation delays of the uplink signal in the sectors being different e.g. due to different multiple reflections.

It will be understood that, instead of performing the joint processing in the centralized unit 2, it is also possible to perform the joint processing of the uplink data originating from one user equipment in its serving base station or cell, respectively. In this case, the data of the at least one non-serving base station will be transferred to the serving base station, e.g. over a cable connection, a data network, etc. as indicated by a dashed line in FIG. 1. In the latter case, the base station $BS_A$ forms a centralized unit for performing joint processing of the uplink data g(n) from the first user equipment UE1, and the second base station $BS_B$ is used as a centralized unit for joint processing of the uplink data s(n) from the second user equipment UE2.

In the following, time synchronicity and frequency synchronicity of the base stations $BS_A$, $BS_B$ and thus also frequency synchronicity of the uplink data g(n), s(n) will be assumed. Further, it will be assumed that in each base station $BS_A$, $BS_B$, the uplink data g(n), s(n) will be received in an individual time base which is aligned to the propagation delay of the user equipment UE1, UE2 served by the respective base station $BS_A$, $BS_B$.

Figure 2:
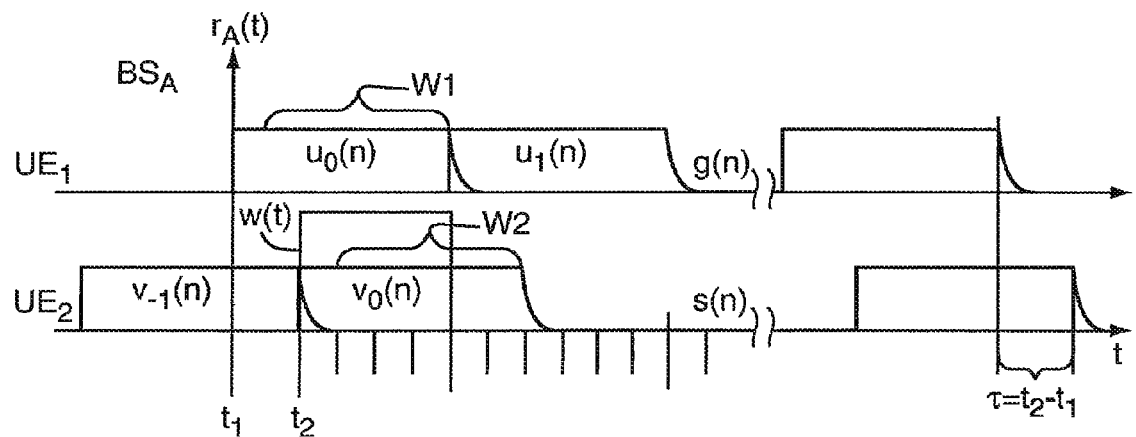
FIG. 2 shows a schematic diagram of uplink data from two user equipments received in one of the base stations of the network of FIG. 1.

For the first base station $BS_A$, the received signal $r_A(t)$ is represented in FIG. 2, showing in the upper part OFDM symbols $u_0(n)$, $u_1(n)$, ... of the uplink data g(n) from the first user equipment UE1 which is served by the first base station $BS_A$. The uplink data g(n), resp., the OFDM symbols $u_0(n)$, $u_1(n)$ are time-aligned to respective FFT processing window W1, covering only that part of the OFDM symbols $u_0(n)$, $u_1(n)$ which does not contain the cyclic prefix. Thus, the signal g(n) received from the served user equipment UE1 is in its optimum position for decoding. An analogous time alignment is also performed for the uplink data s(n) of the second user equipment UE2 which is received in the second base station $BS_B$ (the respective signal not being shown for the sake of simplicity).

The lower part of FIG. 2 shows the OFDM symbols $v_{-1}(n)$, $v_0(n)$, ... of the uplink data s(n) received from the second user equipment UE2 in the first base station $BS_A$. As can be seen from FIG. 2, the position of a FFT processing window W2 for processing the uplink data s(n) is shifted by a timing difference $r=t_1-t_2$, the latter being due to the different propagation delays from the first and second user equipment UE1, UE2 to the first base station $BS_A$. In a similar way, the uplink data g(n) of the first user equipment UE1 is shifted by a timing difference with respect to the optimum position of the FFT window. Consequently, when performing joint processing of uplink data g(n), s(n) received in a common FFT window which is time-aligned to the serving base station $BS_A$, $BS_B$, the influence of the time shift of the signal g(n), s(n) received in the non-serving base station $BS_B$, $BS_A$ has to be taken into account.

In the following, with reference to FIG. 2, the steps will be given to calculate the influence of the signal s(n) in OFDM symbol $s_0(n)$ or of the respective sub-carrier complex amplitude $S_0(f=f_k)$ at sub-carrier frequency $f_k$ on the FFT window W1 if no time shifts of the receive signals $r_A(t)$ at base station $BS_A$ (or $r_B(t)$ at base station $BS_B$) are performed. For this purpose, the signal s(n) received from UE2 depicted in the lower part of FIG. 2 will be analyzed.

If one looks at the signal s(n) in a time-base starting at $t_2$, the signal is described by $$s_0^{CP}(n) * h_{2A}(n) = v_0(n),$$

where $s_0^{CP}(n)$ is the transmit signal from the first user equipment UE1 including a cyclic prefix. In FFT window W2 the result from the FFT would be $S_0(f) \cdot H_{2A}(f)$.

However, when performing a FFT on the signal s(n) using the FFT window W1, the window function w(t) has to be taken into account. First, there is the problem that not all sinusoids are contiguously in the window w(t) (which introduces cross talk between the frequencies of $S_0(f)$). Second, even if this would be the case, still because of the time windowing by w(t), in the frequency domain there occurs a convolution with a window function W(f). If one ignores the discontinuity in the time-base starting at $t_2$, the windowed result is:

$$v_0(n) \approx [s_0(n) \overset{cycl}{*} h_{2A}(n)] \cdot w_\tau(n),$$

and $$V_0(f) \approx [S_0(f) H_{2A}(f)] * W_\tau(f)$$

Then, the result from that in FFT window W1 is $$V_0(f) \approx \{[S_0(f) H_{2A}(f)] * W_\tau(f)\} e^{-j2\pi f \tau}.$$

Thus, for sub-carrier frequency $f_k$, i.e. the value $V_0(f_k)$, not only the transmitted sub-carrier amplitude $S_0(f_k)$, but also $S_0(f_{k-1})$ and $S_0(f_{k+1})$ are relevant (cross-talk). So the decoupling that allowed that one sub-carrier frequency can be detected with a linear equation system in that sub-carrier frequency $f_k$ only, is no longer valid. Further, there is an additional influence from the previous OFDM symbol, that is from $s_{-1}(n)$, such that again, there is a coupling in time-direction between the symbols.

If one ignores also this coupling and models the previous OFDM symbol part as noise, cross-talk over neighboring sub-carriers is still present. If one also wants to ignore this frequency coupling, one has for the resulting coefficients in FFT window W1:

$$[S_0(f_k) H_{2A}(f_k)] \cdot W_\tau(f=0) e^{-j2\pi f_k \tau}.$$

That is, there is not only a phase factor but due to the windowing with partial size there is also an amplitude change with a real factor $W_\tau(f=0)<1$. This contribution needs to be taken into account especially for larger shifts. It may also influence the rank of the derived matrix that needs to be inverted, e.g. for use in a MMSE reception algorithm, which will be detailed in the following.

The uplink COMP joint processing system 1 which is exemplarily illustrated in FIG. 1 may be regarded as a composite MIMO system with an associated channel matrix H, having a dimension corresponding to the number of receiver antennas times the number of transmitter antennas, being a 2×2 matrix in the present (simplified) example with two user equipments UE1, UE2 serving as transmitters and two base stations $BS_A$, $BS_B$ serving as receivers (and supposing that each of these is only equipped with a single antenna). Thus, in the present example, the channel matrix H is given by:

$$H = \begin{pmatrix} h_{1A} & h_{2A} \\ h_{1B} & h_{2B} \end{pmatrix},$$

wherein the first row vector $h_{1A}$, $h_{2A}$ is related to the first uplink data g(n) transmitted from the first user equipment UE1 to the first and second base station $BS_A$, $BS_B$, respectively, and the second row vector $h_{1B}$, $h_{2B}$ is related to second uplink data s(n), being transmitted from the second user equipment UE2 to the first and second base stations $BS_A$, $BS_B$.

In the present example, the wireless communication network 1, more precisely the user equipments UE1, UE2 and the base stations $BS_A$, $BS_B$, are adapted for performing uplink transmissions in an orthogonal frequency division multiplex, OFDM, transmission scheme, dividing the frequency band reserved for the uplink transmission into a plurality of orthogonal sub-carriers. For such an OFDMA transmission scheme, an individual channel matrix H may be defined for each sub-carrier (or for a group of sub-carriers).

A receiver in the centralized unit 2 will jointly process the uplink data g(n), s(n) from the user equipments UE1 and UE2 and may e.g. be devised as a linear Minimum Mean Square Error, MMSE, receiver which calculates its weight matrix $$G = \begin{pmatrix} g_{1A} & g_{1B} \\ g_{2A} & g_{2B} \end{pmatrix} = \begin{pmatrix} g_1^T \\ g_2^T \end{pmatrix}$$

as a function of the channel matrix H (see below). The first row vector of the weight matrix G is the complex antenna weight set used to decode the first uplink data g(n) received from the first user equipment UE1, the second row vector is the antenna weight set used to decode the second uplink data s(n) received from the second user equipment UE2. The formula for the calculation of the weight matrix G in dependence of the channel matrix H for the MMSE receiver is given as follows:

$$G_{MMSE} = (H^H H + \sigma_n^2 I)^{-1} H^H,$$

wherein $H^H = H^{*T}$ is the Hermitian conjugate of the matrix H, $\sigma_n$ is the standard deviation of the Gaussian noise due to the transmission, and the letter I designates the identity matrix.

As described above, a timing advance for the propagation delay of the uplink data g(n) to first user equipment UE1 may be implemented in the serving base station $BS_A$ by shifting the processing window W1 of the time-to-frequency transformation (FFT) accordingly, for example by using a timing offset estimation within the layer1 processing of the serving base station $BS_A$. Likewise, a timing advance may be performed for the second uplink data s(n) being received in the second base station $BS_B$ serving the second user equipment UE2.

The above formula for calculating the receiver weight matrix G is however only valid when both user equipments UE1, UE2 are processed on a common time basis, using a joint Fast-Fourier-Transform. However, as outlined above, the user equipment UE1 has a different distance to the first and to the second base station $BS_A$, $BS_B$, respectively, and the propagation delay of the uplink data g(n) from the first user equipment UE1 to the first and second base station $BS_A$, $BS_B$ will be different.

Thus, when multiple user equipments shall be detected on the same multiple access (time/frequency/code) resource over several base stations $BS_A$, $BS_B$ by MIMO receiver strategies/multi-user detection, the problem occurs that the timing between the uplink signals g(n), s(n) being received in the different base stations $BS_A$, $BS_B$ is completely different.

This problem may be mitigated in an OFDMA transmission system by using an (extended) cyclic prefix that is large enough for the multi-path propagation plus additional propagation differences of the multi-cell COMP system 1. However, using such an extended prefix will increase the overhead and thus reduce the throughput of the system.

In order to avoid such an (extended) cyclic prefix, the timing for each user equipment UE1, UE2 to its own serving base station $BS_A$, $BS_B$ is controlled by the timing advance in the way described above. For the uplink signals g(n), s(n) from the user equipment UE1, UE2 which are received in the respective non-serving base stations $BS_B$, $BS_A$, a separate timing offset/propagation delay estimation is performed and their FFT processing window may be shifted by a corresponding amount in order to be aligned with the individual symbol borders of the user equipments UE1, UE2.

However, the different additional (uncontrolled) propagation delays to non-serving base stations $BS_B$, $BS_A$ for the first and second user equipment UE1 and UE2 have to be taken into account. The derivations above now allow one to define a modified channel matrix:

$$H_{mod} = \begin{pmatrix} h_{1A} & h_{2A} W_{\tau 2A}(f=0) \exp(-j 2\pi f_k \tau_{2A}) \\ h_{1B} W_{\tau 1B}(f=0) \exp(-j 2\pi f_k \tau_{1B}) & h_{2B} \end{pmatrix}$$

The modified channel matrix $H_{mod}$ may then be used for calculating the complex weight matrix G in the centralized unit 2 (see below), the inter-symbol interference being treated as noise.

For the aggregation of the uplink data s(n), g(n) from the different coordinated reception points $BS_A$, $BS_B$ to the centralized unit 2 (coordinator), several options exist: For example, the uplink data s(n), g(n) may be transferred in the form of time domain (IQ) samples to the centralized unit 2. One skilled in the art will appreciate that IQ samples correspond to the Quadrature Phase-Shift Keying (QPSK) modulation format, but that other modulation formats may be used as well.

The timing offset estimation may be performed e.g. in the centralized unit 2. Alternatively, each base station may perform a timing offset estimation for searched user equipments and a calculation of the channel coefficients (in the UE-specific time-base) on its own, and also perform the calculation of the modified channel matrix.

Alternatively, the uplink data may be transferred as frequency domain IQ samples, in the form of soft bits or as decoded data to the centralized unit 2. It will be understood that in any case, the uplink data UD1, UD2 may be transferred to the centralized unit 2 together with information about the timing offset/propagation delay.

In particular, when frequency domain IQ samples are transferred, the steps for multi-user detection may be as follows:

a) In each cell the served user equipments are time-adjusted by TA (timing advance) commands, b) for non-served user equipments, the timing is estimated to find the UE time base. FFTs are performed for doing the channel estimation based on demodulation reference symbols, DM RS, in this shifted time base. The result is the set of channel coefficients per sub-carrier for this timing, and c) the frequency domain I/Q samples from FFTs of the original time base are exchanged together with non-served UE's timing information and channel coefficient information for these UEs, such that the receiving base station can then calculate the modified channel matrix.

Thus, for an optimized performance of a centralized weight processing in the centralized unit 2, it is proposed to transfer the uplink data in the form of time or frequency IQ samples, taking into account the timing offset and the corresponding phase shift per sub-carrier in the updated channel matrix $H_{mod}$, and processing the receiver weights according to:

$$G_{MMSE} = (H_{mod}^H H_{mod} + \sigma_n^2 I)^{-1} H_{mod}^H,$$

i.e. by replacing the channel matrix H by the modified channel matrix $H_{mod}$.

Those skilled in the art will appreciate that although the approach for calculating the weight matrix G in dependence of the modified channel matrix $H_{mod}$ has been described for the example of a MMSE receiver, this approach is not limited to a specific receiver type, and may also be applied to other receiver types.

In the following, several ways for reducing the computational complexity of the present approach will be explained, the computational complexity in particular being reduced by reducing the number of FFTs required for performing the time-to-frequency transformation of the time domain samples of the uplink data.

First, a single joint FFT may be performed for a set of user equipments which have roughly the same propagation delays to the non-serving base station, resp. cell. For that purpose, the user equipments may be grouped into different sets, each set comprising only user equipments having similar propagation delay.

A further approach for complexity reduction may be to update the timing offset estimation (and optionally the grouping as described above) in dependence of the velocity of the user equipments: For slowly moving mobile stations, updates have to be performed less often than for high-speed mobile stations.

Figure 3:
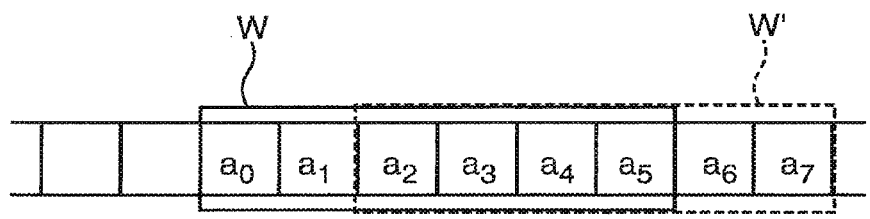
FIG. 3 shows a schematic diagram of the shifting of a FFT processing window in the frequency domain.

A further complexity reduction by reducing the number of necessary FFTs may be achieved in the following way: After a FFT has been performed for a set of time domain samples, e.g. samples $a_0$ to $a_5$ being related to different sub-carriers in a processing window W in the frequency domain, as shown in FIG. 3, instead of performing another FFT for a processing window W' being shifted by two neighbouring time domain samples $a_6$, $a_7$, it is proposed to add the DFT (discrete Fourier transform) contribution per sub-carrier of the two new sample values $a_6$, $a_7$ from the DFT sum and to subtract the first two sample values $a_0$, $a_1$ from the DFT sum, thus resulting in the processing of the samples $a_2$ to $a_7$ in the shifted processing window W'.

The above approach is based on the fact that the DFT sum for the time-to-frequency domain transformed sample $\hat{a}_k$ of the k-th sub-carrier of the OFDMA scheme can be written as:

$$\hat{a}_k = \sum_{j=0}^{N-1} e^{-2\pi i \cdot \frac{jk}{N}} \cdot a_j$$

with k=0, . . . , N−1; wherein N represents the number of sub-carriers for which the processing window is defined.

One skilled in the art will appreciate that using such an approach may result in performing only a few FFTs and shifting the processing window in the above-described manner for generating the other frequency domain samples $\hat{a}_k$. For instance, it may be possible to group the user equipments UE1, UE2 according to their propagation delays, to perform a FFT for each group of user equipments UE1, UE2 and to shift the FFT window in the way described above until all of the user equipments of a particular group are covered.

In summary, by applying the approach described above, uplink coordinated multi-point transmissions may be performed without having to enlarge the cyclic prefix of the OFDMA scheme. Using the above approach thus avoids increasing the overhead due to such a cyclic prefix extension, thus increasing the spectral efficiency of the COMP scheme. It will be readily understood that the approach described above may also be used in transmission schemes being derived from the OFDMA scheme, for example in the so-called Single-Carrier Frequency Division Multiple Access, SC-FDMA, transmission scheme, being a linear pre-coded OFDMA scheme.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as defined by the appended claims, and equivalents thereof.

The invention claimed is:

1. A method for supporting joint processing of uplink data between a plurality of user equipments and a plurality of coordinated reception points, the method comprising:
   estimating individual propagation delays of the uplink data between the plurality of user equipments and the plurality of coordinated reception points;
   compensating a timing difference between a propagation delay of a coordinated reception point which serves at least one of the plurality of user equipments and at least one propagation delay of at least one coordinated reception point which does not serve the at least one of the plurality of user equipments by modifying a channel matrix associated with uplink channels from the at least one of the plurality of user equipments to the plurality of coordinated reception points by:
      performing a phase-shift on channel coefficients of the channel matrix associated with the uplink channels from the at least one of the plurality of user equipments and the at least one non-serving coordinated reception point; and
      modifying an amplitude of the channel coefficients of the channel matrix associated with the uplink channels from the at least one of the plurality of user equipments and the at least one non-serving coordinated reception point.

2. The method according to claim 1, further comprising compensating individual propagation delays of the uplink data transmitted from the at least one of the plurality of user equipments to the plurality of coordinated reception points.

3. The method according to claim 1, wherein modifying the amplitude of the channel coefficients of the channel matrix is performed by multiplying the channel coefficients with a real number smaller than one.

4. The method according to claim 1, wherein the uplink data are arranged in an orthogonal frequency division multiplex (OFDM) transmission scheme, and the method further comprises generating an individual channel matrix for sub-carriers of the OFDM transmission scheme.

5. The method according to claim 1, further comprising: performing a joint calculation of receiver weights for the at least one of the plurality of user equipments, the calculation being based on the channel matrix as modified.

6. The method according to claim 1, further comprising: compensating the propagation delay from a user equipment to its serving coordinated reception point by adjusting the position of a processing window for performing a time-to-frequency-domain transformation, in particular a Fast-Fourier-Transformation (FFT) on symbols of the uplink data.

7. The method according to claim 1, wherein the joint processing comprises: performing a joint time-to-frequency domain transformation, in particular a Fast-Fourier-Transformation (FFT) on time domain samples of the uplink data of the plurality of user equipments having similar propagation delays to a common non-serving coordinated reception point.

8. The method according to claim 1, further comprising: choosing a repetition rate for estimating the propagation delay of the uplink data transmitted from the at least one of the plurality of user equipments to the plurality of coordinated reception points in dependence of the speed of movement of the at least one of the plurality of user equipments.

9. The method according to claim 1, wherein the joint processing comprises: performing a Fast-Fourier-Transformation (FFT) on a number of time domain samples of the uplink data in a processing window, the method further comprising: shifting the processing window by subtracting a discrete Fourier transform (DFT) contribution for sub-carriers of one or more time domain samples at one end of the processing window and adding a DFT contribution for the sub-carriers of a corresponding number of time domain samples at the other end of the processing window.

10. A non-transitory computer-readable medium storing instructions that, when executed by a computer, cause the computer to implement a method for supporting joint processing of uplink data between a plurality of user equipments and a plurality of coordinated reception points, the method comprising:
estimating individual propagation delays of the uplink data between the plurality of user equipments and the plurality of coordinated reception points:
compensating a timing difference between a propagation delay of a coordinated reception point which serves at least one of the plurality of user equipments and at least one propagation delay of at least one coordinated reception point which does not serve the at least one of the plurality of user equipments by modifying a channel matrix associated with uplink channels from the at least one of the plurality of user equipments to the plurality of coordinated reception points by:
performing a phase-shift on channel coefficients of the channel matrix associated with the uplink channels from the at least one of the plurality of user equipments and the at least one non-serving coordinated reception point; and
modifying an amplitude of the channel coefficients of the channel matrix associated with the uplink channels from the at least one of the plurality of user equipments and the at least one non-serving coordinated reception point.

11. A processing arrangement for supporting joint processing of uplink data between a plurality of user equipments and a plurality of coordinated reception points, the processing arrangement comprising: the plurality of coordinated reception points and a processing unit operatively connected to the plurality of coordinated reception points, wherein the processing unit is configured to:
estimate individual propagation delays of the uplink data between the plurality of user equipments and the plurality of coordinated reception points;
compensate a timing difference between a propagation delay of a coordinated reception point which serves at least one of the plurality of user equipments and a propagation delay of at least one coordinated reception point which does not serve the at least one of the plurality of user equipments by modifying a channel matrix associated with uplink channels from the at least one of the plurality of user equipments to the plurality of coordinated reception points by:
performing a phase-shift on channel coefficients of the channel matrix associated with the uplink channels from the at least one of the plurality of user equipments and the at least one non-serving coordinated reception point; and
modifying an amplitude of the channel coefficients of the channel matrix associated with the uplink channels from the at least one of the plurality of user equipments and the at least one non-serving coordinated reception point.

12. The processing arrangement according to claim 11, wherein the processing unit is further configured to compensate individual propagation delays of the uplink data transmitted from the at least one of the plurality of user equipments to the plurality of coordinated reception points.

13. The processing arrangement according to claim 11, wherein the processing unit is configured to perform the amplitude modification by multiplying the channel coefficients with a real number smaller than one.

14. The processing arrangement according to claim 11, wherein the processing unit is further configured to perform a joint calculation of receiver weights for the at least one of the plurality of user equipments, the calculation being based on the channel matrix as modified.

15. The processing arrangement according to claim 11, wherein the uplink data are arranged in an orthogonal frequency division multiplex (OFDM) transmission scheme, and wherein the processing unit is further configured to generate an individual channel matrix for sub-carriers of the OFDM transmission scheme.

* * * * *